US007012423B2

(12) United States Patent
Hasegawa et al.

(10) Patent No.: US 7,012,423 B2
(45) Date of Patent: Mar. 14, 2006

(54) ROTATION ANGLE DETECTOR

(75) Inventors: Shigeru Hasegawa, Nagoya (JP); Masahiro Makino, Kariya (JP); Yasunari Kato, Toyoake (JP)

(73) Assignee: Denso Corporation, (JP)

( * ) Notice: Subject to any disclaimer, the term of this patent is extended or adjusted under 35 U.S.C. 154(b) by 170 days.

(21) Appl. No.: 10/647,213

(22) Filed: Aug. 26, 2003

(65) Prior Publication Data

US 2004/0041558 A1 Mar. 4, 2004

(30) Foreign Application Priority Data

Aug. 30, 2002 (JP) ............................ 2002-253756

(51) Int. Cl.
*G01B 7/30* (2006.01)

(52) U.S. Cl. ................................................ 324/207.25

(58) Field of Classification Search .............................. 324/207.2–207.25, 244, 262; 73/493, 494, 73/514.16, 514.31; 384/448; 123/612, 617
See application file for complete search history.

(56) References Cited

U.S. PATENT DOCUMENTS

| | | | | |
|---|---|---|---|---|
| 5,571,960 A | | 11/1996 | Tateishi et al. | |
| 5,856,774 A | * | 1/1999 | Onodera | 338/118 |
| 6,407,543 B1 | | 6/2002 | Hagio et al. | |
| 6,412,364 B1 | | 7/2002 | Berglar | |
| 6,426,619 B1 | | 7/2002 | Pfaffenberger et al. | |
| 6,505,496 B1 | * | 1/2003 | Kato et al. | 73/1.79 |
| 6,870,364 B1 | * | 3/2005 | Sekiya | 324/207.2 |
| 2003/0107368 A1 | * | 6/2003 | Sekiya | 324/207.2 |
| 2004/0065165 A1 | * | 4/2004 | Sekiya et al. | 74/491 |

FOREIGN PATENT DOCUMENTS

| | | |
|---|---|---|
| JP | 11-264710 | 9/1999 |

OTHER PUBLICATIONS

Patent Abstracts of Japan, vol. 2000, No. 03, Mar. 30, 2000 & JP 11 343882 A (Denso Corp.), Dec. 14, 1999.

* cited by examiner

*Primary Examiner*—Bot Ledynh
(74) *Attorney, Agent, or Firm*—Nixon & Vanderhye PC

(57) ABSTRACT

A rotation angle detector for improving the detection accuracy of a rotation angle has a movable shaft, a bearing portion for pivotably bearing against the movable shaft, a detection portion for detecting a rotation angle of the movable shaft, and a supporting portion for supporting the detection portion. The bearing portion and the supporting portion are integrally formed of the same material. As a result, since the bearing portion and the supporting portion are accurately aligned with each other, displacement of the movable shaft with respect to the detection portion can be prevented. Thus, the detection accuracy of the movable shaft rotation angle can be improved.

7 Claims, 6 Drawing Sheets

ROTATION ANGLE DETECTOR

CROSS REFERENCE TO RELATED APPLICATION

This application is based upon, claims the benefit of priority of, and incorporates by reference, the contents of Japanese Patent Application No. 2002-253756 filed Aug. 30, 2002.

BACKGROUND OF THE INVENTION

1. Field of the Invention

The present invention relates to a rotation angle detector.

2. Description of the Related Art

Generally, a rotation angle detector for detecting a rotation angle of a movable member capable of pivoting, such as an accelerator pedal for a vehicle, has been known. In this rotation angle detector, a rotation angle of a movable shaft, which is cooperatively pivotable with the movable member, is detected by a sensor that is in contact with or not in contact with the movable shaft. The movable shaft is borne by a fixed bearing member, whereas the sensor is supported by a fixed supporting member.

In the above-mentioned rotation angle detector, the bearing member and the supporting member are formed separately from each other. Therefore, if the bearing member and the supporting member are not highly accurately aligned with each other, a displacement of the movable shaft occurs with respect to the sensor. As a result, the detection accuracy with the sensor deteriorates.

SUMMARY OF THE INVENTION

The present invention has been developed with the above limitations in mind and has an object of providing a rotation angle detector for improving the detection accuracy of a rotation angle.

According to a first aspect of a rotation angle detector of the present invention, a bearing portion for pivotably bearing against a movable shaft and a supporting portion for supporting a detection portion for detecting a rotation angle of the movable shaft are integrally formed of the same material. Therefore, since the bearing portion and the supporting portion are accurately aligned with each other, displacement of the movable shaft with respect to the detection portion can be prevented from occurring.

According to a second aspect of the rotation angle detector of the present invention, since the bearing portion and the supporting portion are integrally molded with a resin, the weight of the entire detector can be reduced.

According to a third aspect of the rotation angle detector of the present invention, since the detection portion detects the rotation angle of the movable shaft so as not to be in contact with the movable shaft, the detection portion and the movable shaft can be prevented from abrasively wearing which enhances the endurance of the detector.

The rotation angle detector according to a fourth aspect of the present invention further includes a magnetic portion provided so as to be cooperatively pivotable with the movable shaft to form a magnetic field. The detection portion detects the magnetic field of the magnet portion, which varies in accordance with the rotation angle of the movable shaft. In this structure, a displacement of the movable shaft with respect to the detection portion leads to a change in magnetic field, that is, a change in detected angle. However, since the displacement of the movable shaft with respect to the detection portion can be prevented as described above, high detection accuracy can be ensured.

According to a fifth aspect of the rotation angle detector of the present invention, the detection portion is supported by the supporting portion in the vicinity of the bearing portion. In such a structure, since a rotation angle in the vicinity of a portion of the movable shaft, which is borne by the bearing portion to have little shaft displacement, can be detected by the detection portion, further improvement in detection accuracy can be expected.

According to a sixth aspect of the rotation angle detector of the present invention, the movable shaft is provided so as to be cooperatively pivotable with an accelerator pedal for a vehicle. Since the accelerator pedal for a vehicle is pressed down by the foot of a driver, the load applied on the accelerator pedal is relatively large. The bearing portion, which bears the movable shaft so as to be cooperatively pivotable with the accelerator pedal, is subjected to a displacement force by the load applied on the accelerator pedal. However, since the bearing portion and the supporting portion are integrally formed of the same material, relative displacement of a bearing position with respect to the detection portion can be prevented. Therefore, the rotation angle of the accelerator pedal for a vehicle can be accurately and precisely detected.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 2:
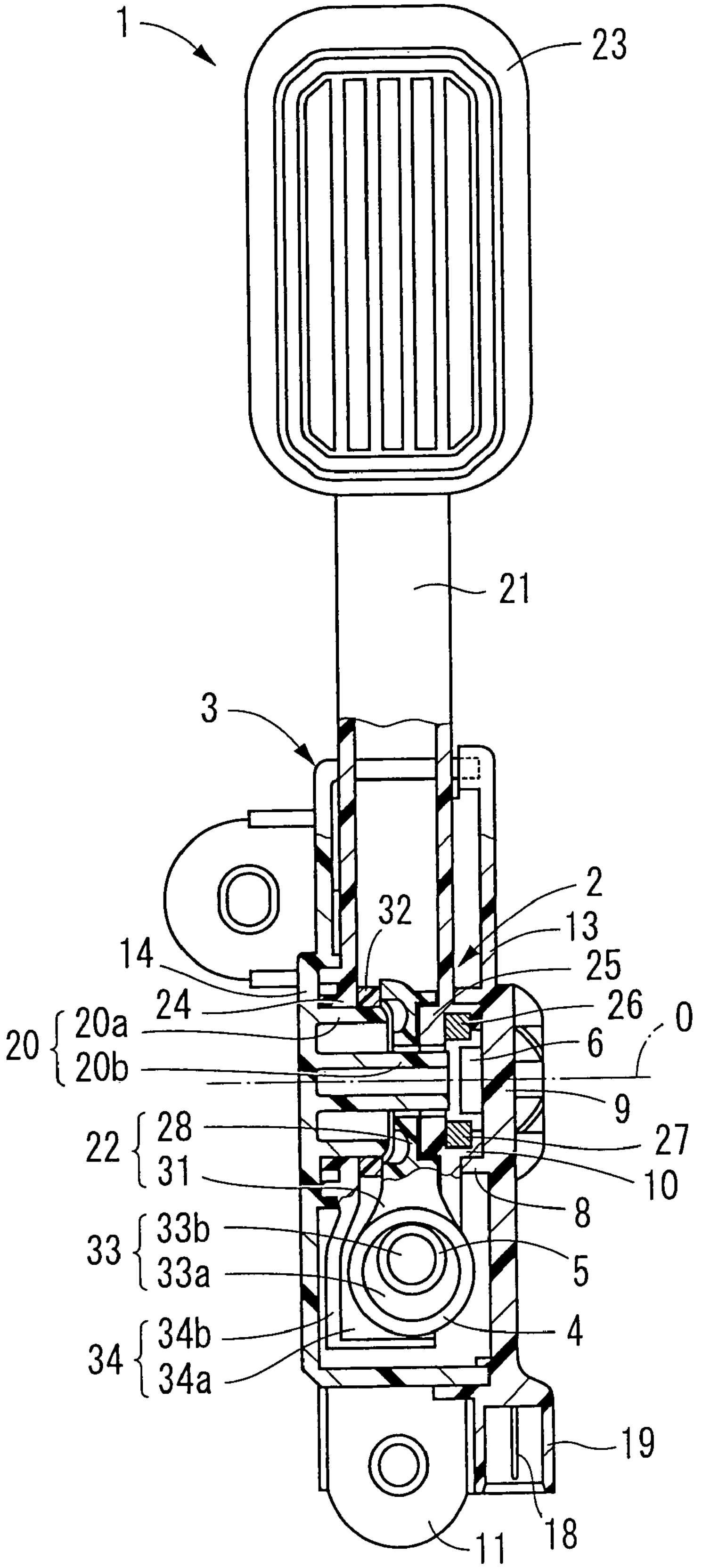
FIG. 2 is a partial cutaway plan view and cross-sectional view showing the accelerator apparatus according to one embodiment of the present invention.
Figure 3:
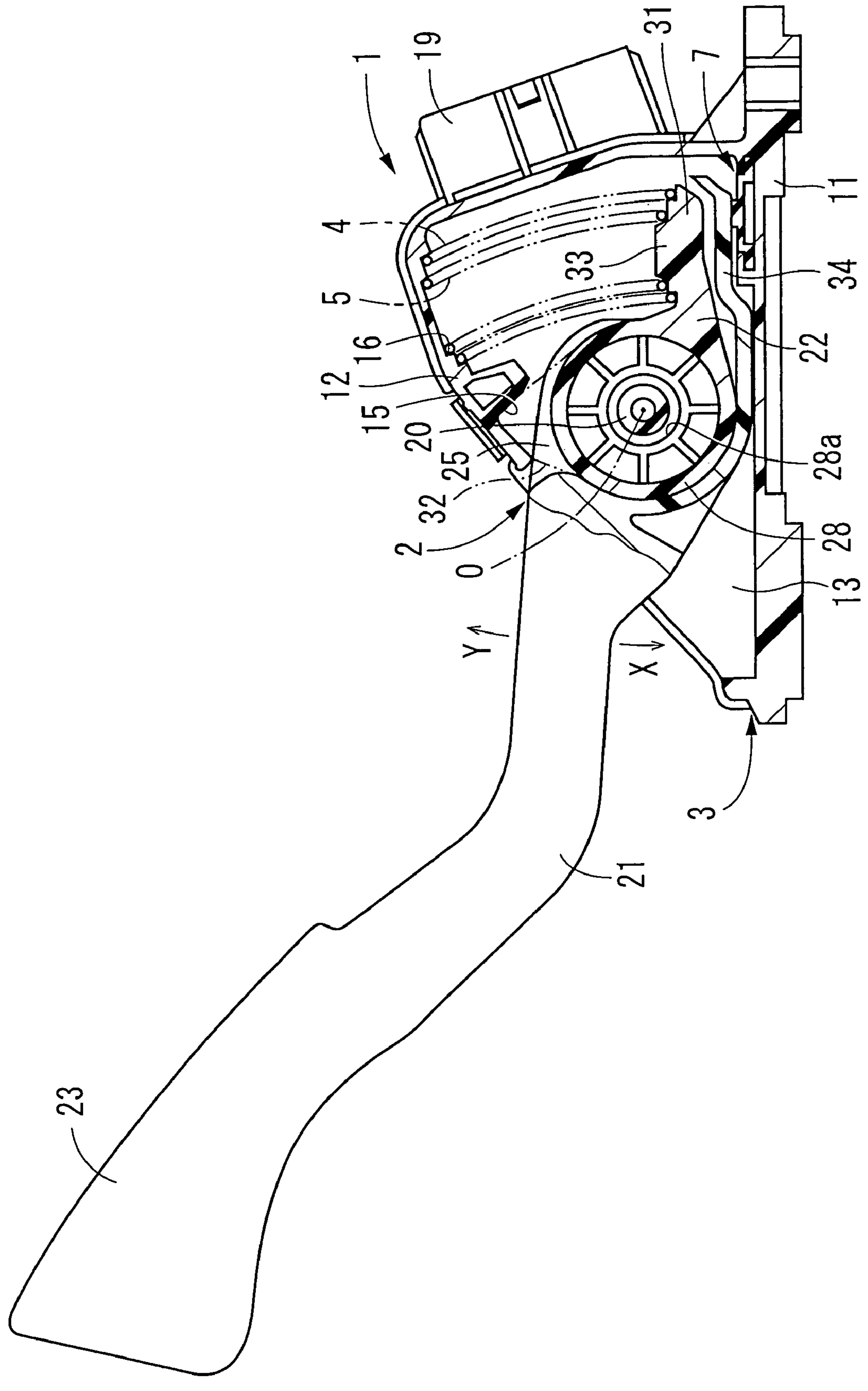
FIG. 3 is a partial cutaway side view and cross-sectional view showing the accelerator apparatus according to one embodiment of the present invention.
Figure 4A:
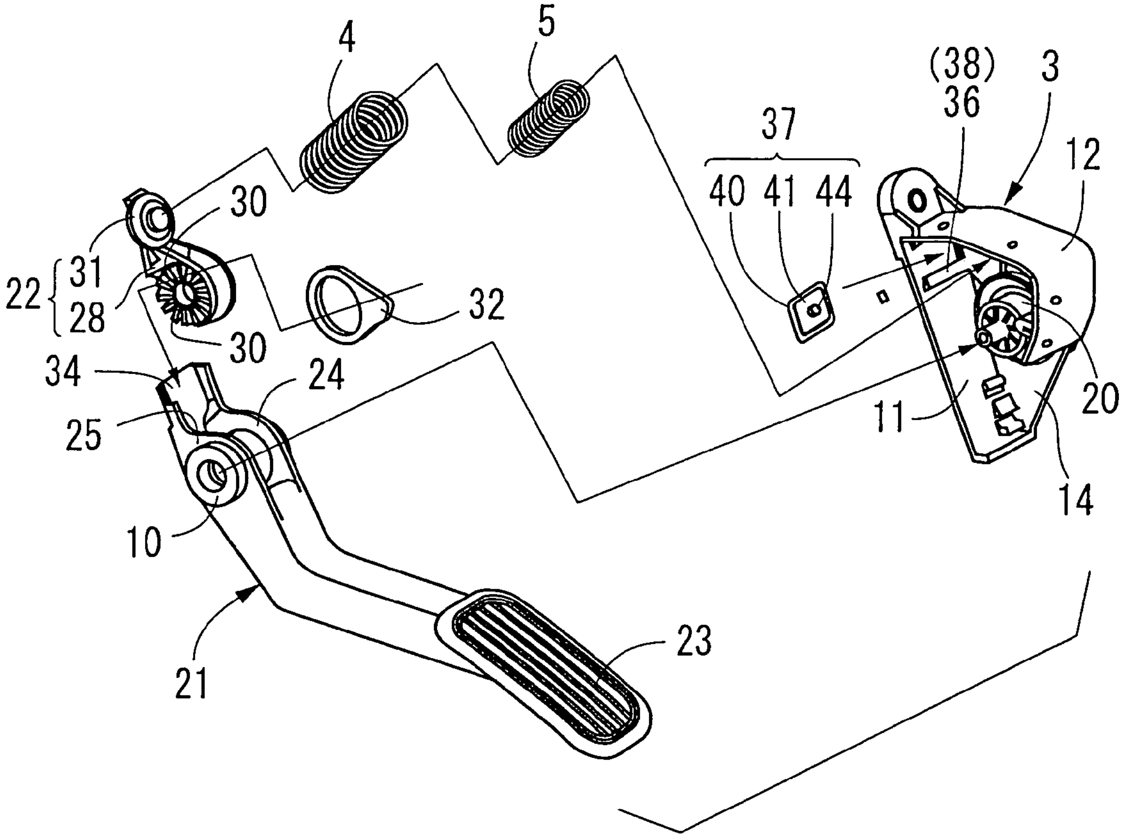
FIG. 4A shows an exploded perspective view of the accelerator apparatus according to one embodiment of the present invention.
Figure 4B:
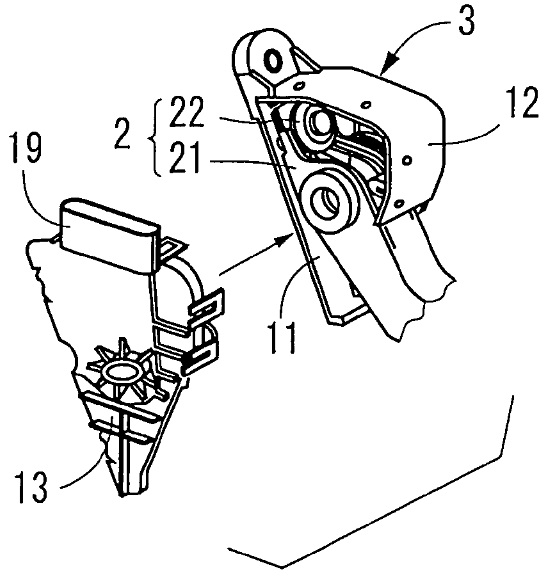
FIG. 4B shows an exploded perspective view of a portion of the accelerator apparatus according to one embodiment of the present invention.

An accelerator apparatus including a rotation angle detector according to one embodiment of the present invention is shown in FIGS. 2 and 3. Exploded views of the accelerator apparatus are shown in FIGS. 4A and 4B. An accelerator apparatus 1 is mounted on a vehicle so as to control an operational state of a vehicle in accordance with the amount of force applied on an accelerator pedal 2 by a driver's foot. The accelerator apparatus 1 according to this embodiment employs an accelerator-by-wire system. Therefore, the accelerator pedal 2 is not mechanically connected to a throttle device of a vehicle. Instead, the accelerator apparatus 1 transmits a rotation angle of the accelerator pedal 2 to an engine control unit (ECU) of the vehicle so that the ECU controls the throttle device based on the rotation angle.

In the accelerator apparatus 1, the accelerator pedal 2 is pivotably supported about a pivot axis 0 by a housing 3. The accelerator pedal 2 is energized by two return springs 4, 5 in a direction opposite to the direction in which the driver presses on the accelerator pedal 2. A rotation angle of the accelerator pedal 2, which pivots based on the force applied on the pedal by the driver and the energizing force of the return springs 4, 5, is detected by a rotation angle sensor 6 and is transmitted to the ECU.

Figure 1:
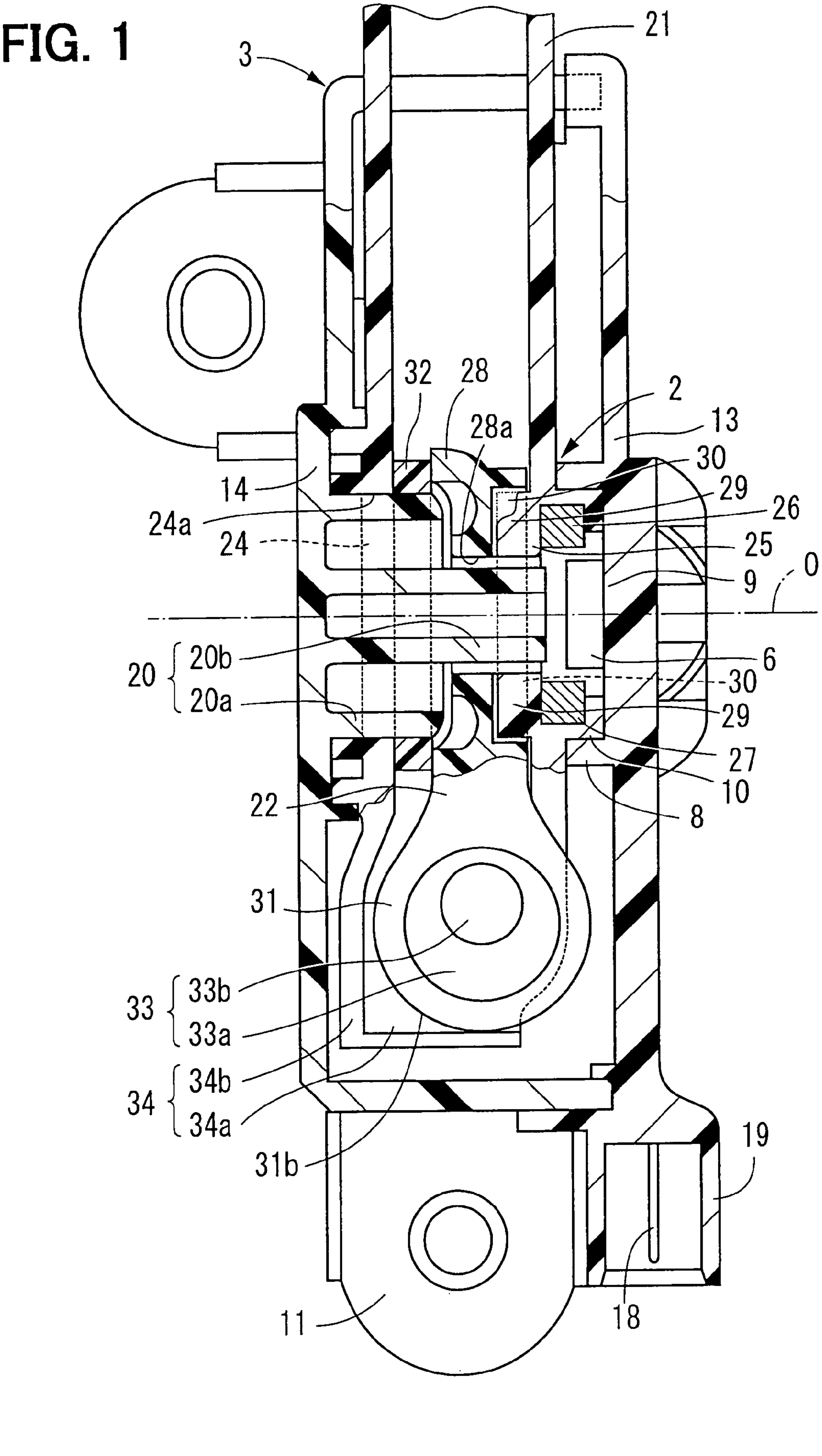
FIG. 1 is a partial cutaway plan view and cross-sectional view showing a principal part of an accelerator apparatus according to one embodiment of the present invention.

Hereinafter, the structure of the accelerator apparatus 1 will be described in further detail. As shown in FIGS. 1 to 3, the housing 3, which serves as a supporting member, is made of a resin in a box-like shape. The housing 3 includes a bottom plate 11, a top plate 12 that faces the bottom plate 11, and two side plates 13, 14 that face each other so as to be perpendicular to the bottom plate 11 and the top plate 12.

Figure 5:
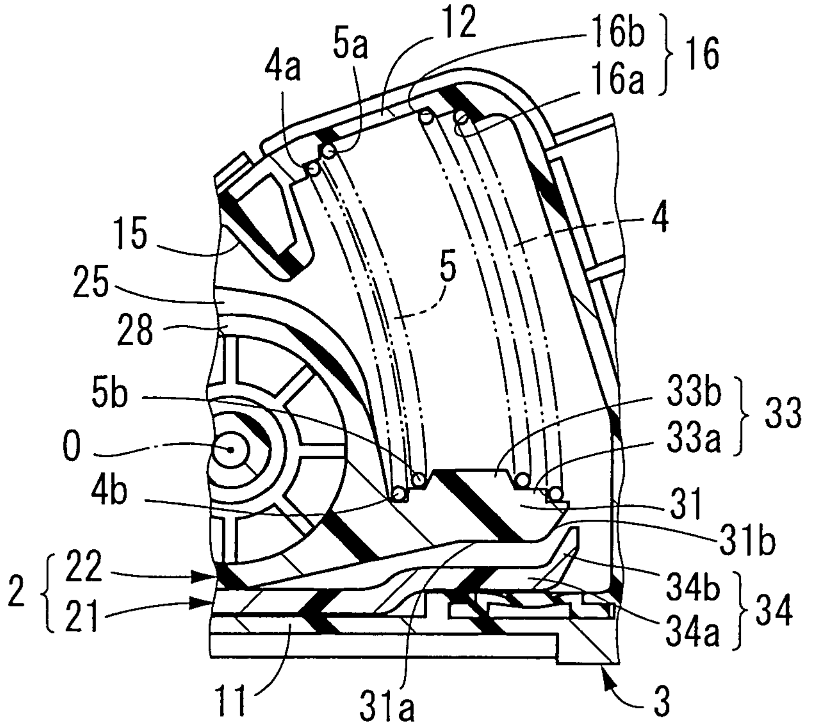
FIG. 5 is an enlarged view of a principal portion of FIG. 3, showing a normal state of a locking portion of the accelerator apparatus according to one embodiment of the present invention.

The bottom plate 11 is fixed to a vehicle body with bolts or the like. A pedal stopper portion 7 described below is provided on an inner wall of the bottom plate 11. An engaging portion 15 and locking holes 16 are formed on an inner wall of the top plate 12. As shown in FIG. 5, each of the locking holes 16 is formed so that a cross-sectional area of a deep portion 16*b* is smaller than that of an entry portion 16*a*.

One side plate 13 is attachable to and removable from another site of the housing 3 as shown in FIG. 4B. On the side plate 13, a bearing portion 8 and a supporting portion 9 are integrally molded using a resin. The bearing portion 8 protrudes from an inner wall of the side plate 13 in a cylindrical form. The supporting portion 9 is formed by a portion of the side plate 13 which closes a base end side of the bearing portion 8. The supporting portion 9 supports a rotation angle sensor 6 that functions as a detection portion on the inner circumferential side of the bearing portion 8. A connector 19, which has a terminal 18 electrically connected to the rotation angle sensor 6, is provided on an outer wall of the side plate 13 so that the terminal 18 is embedded in the side plate 13.

On the inner wall of the other side plate 14, a shaft portion 20 projecting toward the side plate 13 is formed. The shaft portion 20, which extends along the pivot axis 0 of the accelerator pedal 2, has a base end 20*a* having a larger diameter and a tip 20*b* having a smaller diameter.

As shown in FIGS. 1 to 3, the accelerator pedal 2 is constituted by a pedal arm 21 and a spring rotor 22. The pedal arm 21, which is made of a resin, extends in a "V" shape. One end of the pedal arm 21 forms an operational portion 23 which is pressed down by the foot of the driver. The other end of the pedal arm 21 forms two side walls 24, 25 housed within the housing 3. The side walls 24, 25 face each other so as to be in parallel with each other in the pivot axis 0 direction. The side wall 24 facing the side plate 14 is supported by the base end 20*a* of the shaft portion 20 inserted into a through hole 24*a* formed in the side wall 24. As a result, the pedal arm 21 is pivotable about the pivot axis 0. When the driver presses down on the operational portion 23, the pedal arm 21 rotates in the X direction of FIG. 3, which is identical with a direction in which the operational portion 23 is pressed down.

The movable shaft 10 is formed of a resin and is integrally molded with the side wall 25 of the pedal arm 21, which faces the side plate 13. As shown in FIG. 1, the movable shaft 10 projects from the side wall 25 on the side plate 13 side in an approximately cylindrical shape about the pivot axis 0. The movable shaft 10 is fitted into the bearing 8 of the side plate 13 on its inner circumferential side so as to be borne thereby. Magnet portions 26 and 27, each having a different polarity, are cooperatively and pivotably embedded at two positions of the movable shaft 10 in a circumferential direction, sandwiching the pivot axis 0. A direction of a magnetic field formed by the two magnet portions 26, 27 varies depending on the rotation angle of the movable shaft 10. The rotation angle sensor 6 supported by the supporting portion 9 of the side plate 13 includes a hall device, a magneto-resistance device, or the like, so that the magnetic field formed by the magnet portions 26, 27 provided on the outer circumferential side of the rotation angle sensor 6 at an interval is detected in a non-contact manner with the movable shaft 10. The rotation angle sensor 6 outputs a detection signal to the ECU electrically connected to the terminal 18. The detection signal output from the rotation angle sensor 6 represents a rotation angle of the movable shaft 10, that is, a rotation angle of the pedal arm 21.

As described above, in this embodiment, the rotation angle detector is constituted by the rotation angle sensor 6, the bearing portion 8, the supporting portion 9, the movable shaft 10, the terminal 18, the magnetic portions 26, 27, and the like.

As shown in FIGS. 1 to 3, the spring rotor 22 is made of a resin that forms a disk-like pivoting portion 28. The spring rotor 22 is provided so that both side faces of the pivoting portion 28 are sandwiched between the side walls 24, 25 of the pedal arm 21. The shaft 20 is inserted into an inner hole 28*a* of the pivoting portion 28 so as to leave a gap. As a result, the spring rotor 22 is pivotable about the pivot axis 0.

On the side face of the pivoting portion 28 on the side wall 25 side, a plurality of helical teeth 30 are provided as shown in FIG. 4A. The plurality of helical teeth 30 are arranged about the pivot axis 0 at equal intervals. A plurality of helical teeth 29 are also provided on the side wall 25 of the pedal arm 21 on its pivoting portion 28 side. The plurality of helical teeth 29, which are arranged about the pivot axis 0 at equal intervals, mate with any of the helical teeth 30 facing the helical teeth 29 in the pivot axis 0 direction.

As a result of such mating, the pedal arm 21 and the spring rotor 20 are capable of rotating together. For example, when the driver presses down on the operational portion 23 of the pedal arm 21, the spring rotor 22 rotates in the X direction in FIG. 3. A friction washer 32 is interposed between the side face of the pivoting portion 28 on the side wall 24 side and the wall face of the side wall 24 on the pivoting portion 28 side. The friction washer 32 is engaged with the engaging portion 15 of the top plate 12 so as not to be capable of pivoting, as indicated with a double dot line in FIG. 3. The friction washer 32 is in sliding contact with both the pivoting portion 28 and the side wall 24 to generate a frictional force.

The spring rotor 22 further has a locking portion 31 which is integrally formed of a resin with the pivoting portion 28. As shown in FIGS. 2 and 5, the locking portion 31 projects from the outer circumferential edge of the pivoting portion 28 in a plate-like form in its tangential direction so that both of its surfaces face the bottom plate 11 and the top plate 12, respectively. A protrusion 33 in an approximately cylindrical shape with a step projects from a face of the locking portion 31 on the top plate 12 side. The protrusion 33 is formed by decentering a major diameter portion 33*a* on the base end side and a minor diameter portion 33*b* on the tip side from each other. The first return spring 4 and the second return spring 5 serve as energizing members and are interposed between the face of the locking portion 31 on the top plate 12 side and the inner wall of the top plate 12.

The first and the second return springs 4, 5 are both constituted by compression coil springs. As shown in FIGS. 1 and 5, the second return spring 5, which has a smaller coil diameter than that of the first return spring 4, is provided on the inner circumferential side of the first return spring 4. Ends 4*a*, 5*a* of the respective return springs 4, 5 are fitted into the entry portion 16*a* side and the deep portion 16*b* side of the locking holes 16 provided in the top plate 12 so as to be locked thereby. On the other hand, the other ends 4*b*, 5*b* of the respective return springs 4, 5 are fitted into the major diameter portion 33*a* and the minor diameter portion 33*b* of the protrusion 33 provided on the locking portion 31. With such a structure, each of the return springs 4, 5 energizes the locking portion 31 in such a direction that the pedal arm 21 and the spring rotor 22 rotate in the pressing direction X and are pulled back in a Y direction in FIG. 3.

Figure 6:
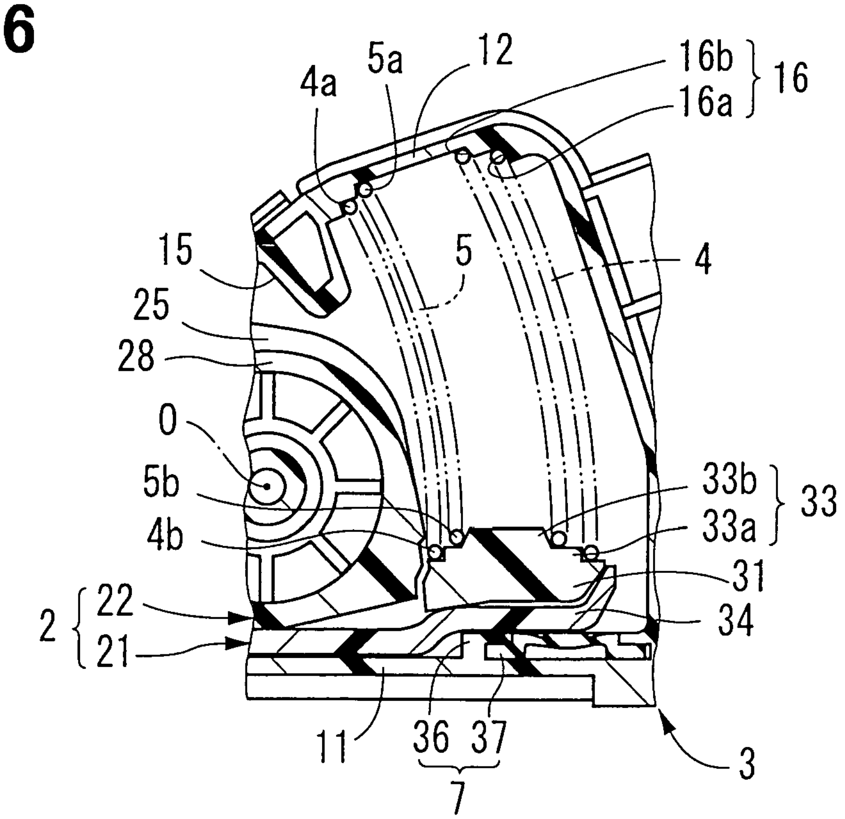
FIG. 6 is an enlarged view corresponding to FIG. 5, showing a broken state of the locking portion of the accelerator apparatus according to one embodiment of the present invention.

An auxiliary locking portion 34 is provided ahead of the locking portion 31 in an energizing direction of each of the return springs 4, 5, that is, so as to face the side of the locking portion 31 opposite to the side of the return springs in this embodiment. The auxiliary locking portion 34 is integrally formed of a resin with an end of the pedal arm 21 opposite to the operational portion, presenting a shallow dish-like shape. The auxiliary locking portion 34 covers parts of the face 31*a* of the locking portion 31 on the side opposite to the return spring side and the outer circumferential edge 31*b* of the locking portion 31 at an arbitrary rotation position of the pedal arm 21 and the spring rotor 22. As a result, when the locking portion 31 is broken to be released from the pivoting portion 28 as shown in FIG. 6, the auxiliary locking portion 34 locks the locking portion 31. At this time, since the locking portion 31 is capable of surely holding the ends 4*b*, 5*b* of the respective return springs 4, 5 while the ends 4*b*, 5*b* are being fitted into the protrusion 33, the auxiliary locking portion 34 is capable of indirectly locking the ends 4*b*, 5*b* of the respective return springs 4, 5. As shown in FIGS. 1 and 5, when the locking portion 31 is in a normal state, the face 31*a* of the locking portion 31 and the inner wall of the bottom wall 34*a* of the auxiliary locking portion 34 are separated from each other, which in turn separates the outer circumferential edge 31*b* of the locking portion 31 and the inner wall of the side wall 34*b* of the auxiliary locking portion 34 from each other. As a result, the auxiliary locking portion 34 does not lock the return springs 4, 5 when the locking portion 31 is in a normal state.

Figure 7:
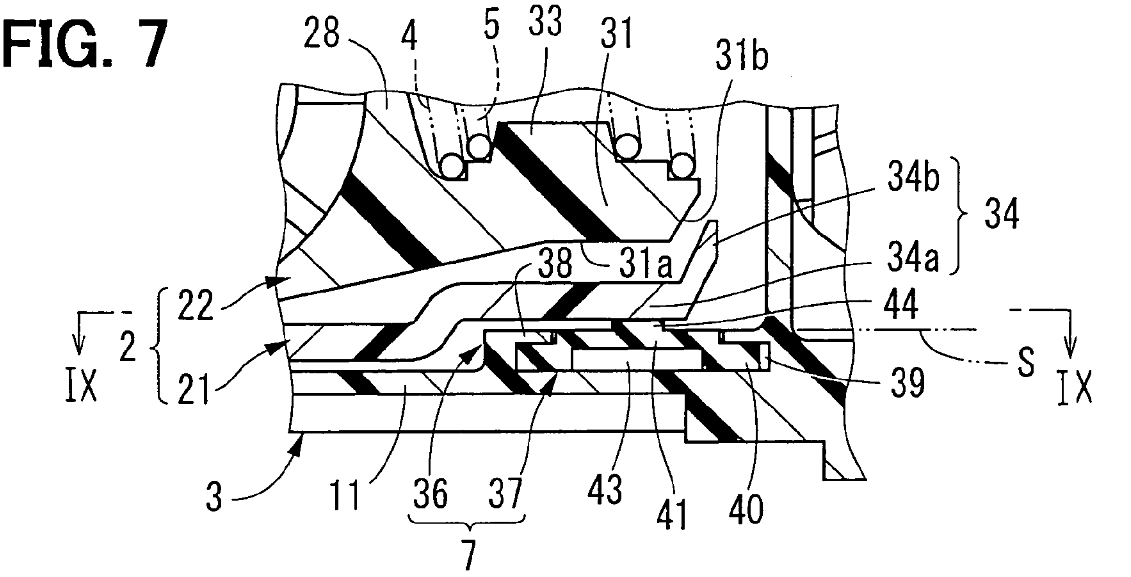
FIG. 7 is an enlarged view of a principal portion of FIG. 3, for explaining an operation state of the accelerator apparatus according to one embodiment of the present invention.
Figure 8:
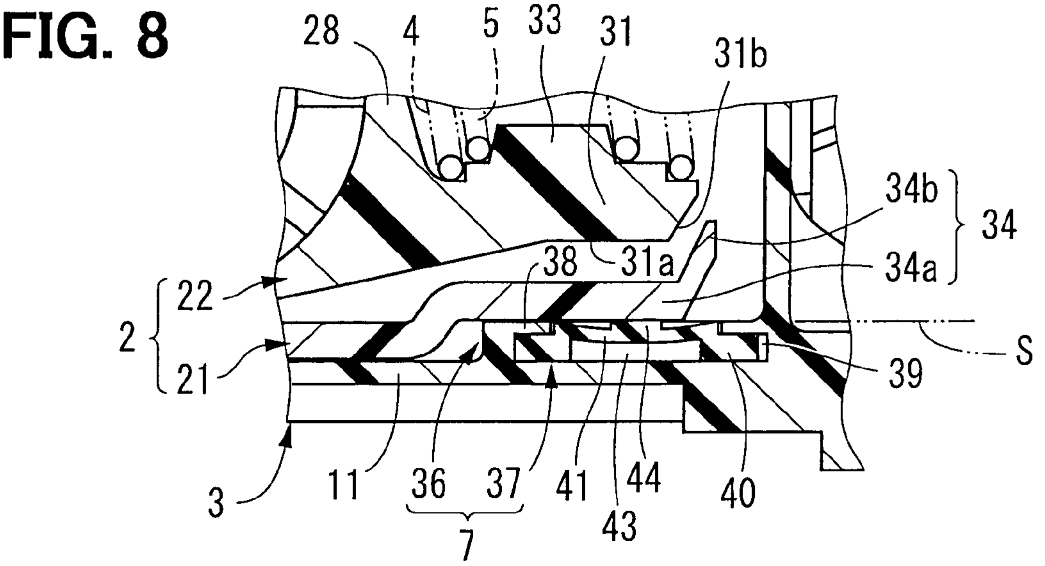
FIG. 8 is an enlarged view corresponding to FIG. 7, for explaining another operational state of the accelerator apparatus according to one embodiment of the present invention.
Figure 9:
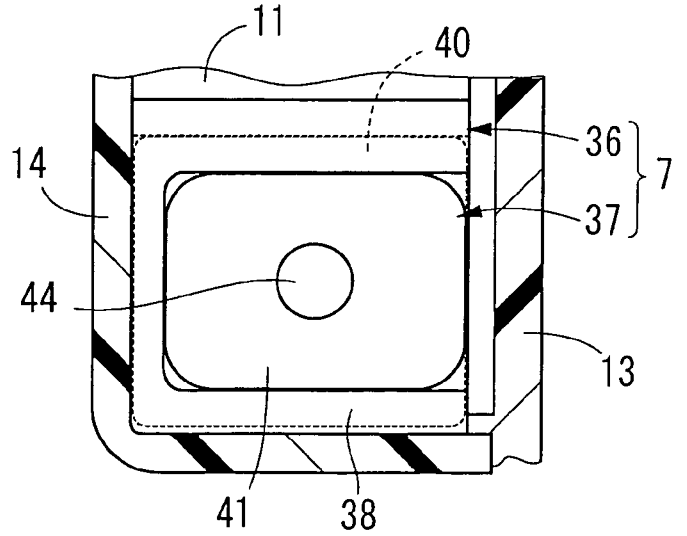
FIG. 9 is a cross-sectional view taken along the line IX—IX in FIG. 7.

As shown in FIG. 3, a pedal stopper portion 7 is provided ahead of the auxiliary locking portion 34 in the energizing direction of each of the return springs 4, 5. The pedal stopper portion 7 is constituted by a rigid member 36 and an elastic member 37, as shown in FIGS. 7 to 9.

The rigid member 36 is integrally formed of a resin with the bottom plate 11, and has a higher rigidity than that of the elastic member 37. The rigid member 36 forms its U-shaped plate-like abutting portion 38 so as to be parallel to the inner wall of the bottom plate 11. A space between both ends of the U shape of the abutting portion 38 is provided on the attachable and removable side plate 13 side. The bottom wall 34*a* of the auxiliary locking portion 34 is capable of abutting against the face of the abutting portion 38 on the side opposite to the bottom plate. When the auxiliary locking portion 34 abuts against the abutting portion 38, the rigid member 36 is interposed between the auxiliary locking portion 34 and the bottom plate 11 so as to be pressed therebetween.

The elastic member 37 is formed of an elastic material such as an elastomer. The elastic member 37 forms its base portion 40 fitted into a gap 39 between the bottom plate 11 and the abutting portion 38 so as to have a rectangular frame-like form. As shown in FIG. 4A, the base portion 40 is fitted into the gap 39 in a sliding manner from the side from which the side plate 13 is removed so that the elastic member 37 is fixed to the bottom plate 11. The elastic member 37 further forms a deformable portion 41 covering an opening in the base portion 40 on the side opposite to the bottom plate. The deformable portion 41 presents a rectangular plate-like shape smaller than the base portion 40, and is fitted into the U-shape of the abutting portion 38 on its inner circumferential side. A face of the deformable portion 41 on the base portion side, the inner circumferential edge of the base portion 40, and the inner wall of the bottom plate 11 form a space 43 for accelerating the flexible deformation of the deformable portion 41.

The elastic member 37 further forms a projection 44 projecting from the central portion of the deformable portion 41 on the face opposite to the base portion side. When the deformable portion 41 is not deformed as shown in FIG. 7, the projection 44 projects toward the auxiliary locking portion 34 from a virtual plane S on which the face of the abutting portion 38 opposite to the bottom plate side is positioned. The bottom wall 34*a* of the auxiliary locking portion 34 is capable of abutting against a tip of the projection 44. When the auxiliary locking portion 34 abuts against the projection 44, the elastic member 37 is interposed between the auxiliary locking portion 34 and the bottom plate 11 so as to be pressed therebetween.

Next, an operation of the accelerator apparatus 1 will be described. When the driver adjusts the amount of force on the pedal arm 21 of the accelerator 2, the pedal arm 21 and the spring rotor 22, whose helical teeth 29, 30 mate with each other, pivot together in sliding contact with the friction washer 32. At this time, the rotation angle sensor 6 detects a rotation angle of the movable shaft 10 which rotates cooperatively with the pedal arm 21, based on the magnetic field formed by the magnetic portions 26, 27.

When the driver increases the force on the pedal, the pedal arm 21 and the spring rotor 22 pivot in the pressing direction X in FIG. 3. With such rotation, a combined energizing force $F_s$ of the return springs 4, 5 and a frictional force $F_f$ between the return springs 4, 5 and the friction washer 32 act on the pedal arm 21 and the spring rotor 22 in a direction Y opposite to the pressing direction X. At this time, the return springs 4, 5, which are compressed in accordance with the force on the pedal arm 21, increase the combined energizing force $F_s$.

Moreover, the mating action between the helical teeth 29, 30 increases a force in the pivot axis 0 direction for separating the side wall 25 of the pedal arm 21 and the pivoting portion 28 of the spring rotor 22 from each other in accordance with the force on the pedal arm 21, thereby concurrently increasing the frictional force $F_f$.

On the other hand, when the driver decreases the force on the pedal, the pedal arm 21 and the spring rotor 22 rotate in the pullback direction Y in FIG. 3 by the combined energizing force $F_s$ of the return springs 4, 5. Along with the rotation, the frictional force $F_f$ between the pedal arm 21 and the spring rotor 22, and the friction washer 32 acts on the pedal arm 21 and the spring rotor 22 in the direction X opposite to the combined energizing force $F_s$ of the return springs 4, 5. At this time, the return springs 4, 5, which expand in accordance with the pullback of the pedal arm 21, decreases the combined energizing force $F_s$. Moreover, the mating action between the helical teeth 29, 30 decreases the force in the pivot axis 0 direction for separating the side wall 25 of the pedal arm 21 and the pivoting portion 28 of the spring rotor 22 from each other in accordance with the pullback of the pedal arm 21. Concurrently, the frictional force $F_f$ decreases.

As described above, a hysteresis is generated in characteristics of the force acting on the pedal arm 21 and the spring rotor 22 between the pressing of the accelerator pedal 2 and its pullback. Accordingly, the accelerator pedal 2 can be easily held at a fixed position.

When the accelerator pedal 2 is pulled back, the auxiliary locking portion 34 of the pedal arm 21 abuts against the pedal stopper portion 7 so that the rotation of the pedal arm 21 and the spring rotor 22 in the pullback direction Y are restrained. Specifically, as shown in FIG. 7, the auxiliary locking portion 34 abuts against the projection 44 of the elastic member 37. Furthermore, as the auxiliary locking portion 34 further rotates in the pullback direction Y, the elastic member 37 interposed and pressed between the auxiliary locking portion 34 and the bottom plate 11 diffuses a load acting on the projection 44 to the deformable portion 41. As a result, the deformable portion 41 is flexibly deformed in the space 43 toward the side opposite to the projection 44, as shown in FIG. 8. When the deformation of the deformable portion 41 presses back the tip end face of the projection 44 to the virtual plane S as shown in FIG. 8, the auxiliary locking portion 34 abuts against the abutting portion 38. Since the rigid member 36 interposed and pressed between the auxiliary locking portion 34 and the bottom plate 11 is made of a highly rigid material, the rigid member 36 is not substantially elastically deformed thereby. In this manner, the rigid member 36 determines a rotation limit of the auxiliary locking portion 34, which in turn determines a rotation limit of the pedal arm 21 and the spring rotor 22.

According to the accelerator apparatus 1 in the above-described embodiment, since the bearing portion 8 and the supporting portion 9 are integrally formed of the same material so as to enable highly accurate alignment therebetween, a displacement of the movable shaft 10 with respect to the rotation angle sensor 6 can be prevented. Moreover, according to this accelerator apparatus 1, since the supporting portion 9 supports the rotation angle sensor 6 on the inner circumferential side of the bearing 8, that is, in the vicinity of the bearing portion 8, a rotation angle of a portion of the movable shaft 10, which is borne by the bearing portion to have little shaft displacement, can be detected by the rotation angle sensor 6. According to such an accelerator apparatus 1, a rotation angle of the movable shaft 10, and thus a rotation angle of the pedal arm 21, can be precisely detected.

In addition, in the accelerator apparatus 1, since the rotation angle sensor 6 detects a rotation angle so as not to be in contact with the movable shaft 10, the degradation of the rotation angle sensor 6 and the movable shaft 10 by physical wear is prevented to improve the endurance of the apparatus.

Moreover, in the above-described embodiment, although the rotation angle detector according to the present invention is applied to the accelerator apparatus 1 in order to detect the rotation angle of the accelerator pedal 2 (the pedal arm 21) of the accelerator apparatus 1, the present invention is applicable to various apparatuses including a movable member capable of pivoting.

Furthermore, in the above-described embodiment, although the bearing portion 8 and the supporting portion 9 are made of a light weight resin, any other material can be appropriately selected as a material for forming the bearing portion and the supporting portion as long as the same material is used for the bearing portion and the supporting portion.

Moreover, in the above-described embodiment, although the non-contact type rotation angle sensor 6 is used as a detection portion, a contact type sensor for detecting a rotation angle of the movable shaft 10 in contact with the movable shaft 10 can also be used as a detection portion. Even if the axis circumference is changed by inputting from the pedal, the detection portion is integrally displaced with the bearing anywhere around the center portion of the bearing. Accordingly, the displacement of the axis of the accelerator pedal and the detection portion is the same or becomes nearly so. This makes the generation of an output gap unlikely. In the case that the axis of the accelerator pedal and the axis-supporting member are integrally molded with resin, the pedal becomes more compact. On the other hand, in case of an input in the transverse direction of the pedal, the rigidity of the circumference of the axis increases. Accordingly, the displacement of the axis is large. However, even in such a case, detection accuracy can be maintained by using the structures of the invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A rotation angle detector comprising:

a movable shaft;

a bearing portion for pivotably bearing against the movable shaft;

a detection portion for detecting a rotation angle of the movable shaft;

a supporting portion for supporting the detection portion; and a magnet portion provided to be cooperatively pivotable with the movable shaft, for forming a magnetic field, wherein the bearing portion and the supporting portion are integrally formed of the same material, the movable shaft is cooperatively pivotable with a vehicular accelerator pedal, and the detection portion detects the magnetic field formed by the magnet portion, the magnetic field varying in accordance with the rotation angle of the movable shaft.

2. A rotation angle detector comprising:

a movable shaft;

a bearing portion for pivotably bearing against the movable shaft;

a detection portion for detecting a rotation angle of the movable shaft;

a supporting portion for supporting the detection portion; and a magnet portion provided to be cooperatively pivotable with the movable shaft, for forming a magnetic field, wherein the bearing portion and the supporting portion are integrally formed of the same material, the movable shaft is cooperatively pivotable with a vehicular accelerator pedal, the bearing portion and the supporting portion are integrally molded of a resin, and the detection portion detects the magnetic field formed by the magnet portion, the magnetic field varying in accordance with the rotation angle of the movable shaft.

3. The rotation angle detector according to claim 1, wherein the detection portion is supported by the supporting portion in a vicinity of the bearing portion.

4. The rotation angle detector according to claim 2, wherein the detection portion is supported by the supporting portion in a vicinity of the bearing portion.

5. A rotation angle detector comprising:

a movable shaft;

a bearing portion for pivotably bearing against the movable shaft;

a detection portion for detecting a rotation angle of the movable shaft; and a supporting portion for supporting the detection portion, wherein the bearing portion and the supporting portion are integrally formed of the same material, the movable shaft is cooperatively pivotable with a vehicular accelerator pedal, the detection portion is supported by the supporting portion in a vicinity of the bearing portion, and the detection portion is placed at an inner circumferential side of the bearing portion.

6. A rotation angle detector comprising:

a movable shaft;

a bearing portion for pivotably bearing against the movable shaft;

a detection portion for detecting a rotation angle of the movable shaft; and a supporting portion for supporting the detection portion, wherein the bearing portion and the supporting portion are integrally formed of the same material, the movable shaft is cooperatively pivotable with a vehicular accelerator pedal, and an axis of the vehicular accelerator pedal and an axis-supporting member are integrally molded with resin.

7. The rotation angle detector according to claim 5, wherein an axis of the vehicular accelerator pedal and an axis-supporting member are integrally molded with resin.

* * * * *